United States Patent Office 3,429,247
Patented Feb. 25, 1969

3,429,247
PHOTOGRAPHIC SHUTTER
Christopher R. Rice, Wakefield, Mass., assignor to Polaroid Corporation, Cambridge, Mass., a Corporation of Massachusetts
Filed Oct. 12, 1966, Ser. No. 586,081
U.S. Cl. 95—61     5 Claims
Int. Cl. G03b 9/20

This invention relates to photographic shutters and particularly to a novel shutter useful for substantially simultaneously opening and closing a plurality of exposure apertures.

An object of this invention is to provide a relatively easy to operate and inexpensive photographic shutter for opening and closing one or more exposure apertures.

It is another object of this invention to provide a shutter for photographic apparatus having a plurality of exposure apertures wherein substantially simultaneous exposures are produced through all the exposure apertures in response to a single operation of the shutter.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The apparatus of the present invention, in a preferred embodiment, is useful in a photographic camera having a plurality of exposure apertures for producing a simultaneous exposure through each aperture to form a plurality of images on a sheet of photographic film positioned in the focal plane of the camera.

Figure 1:
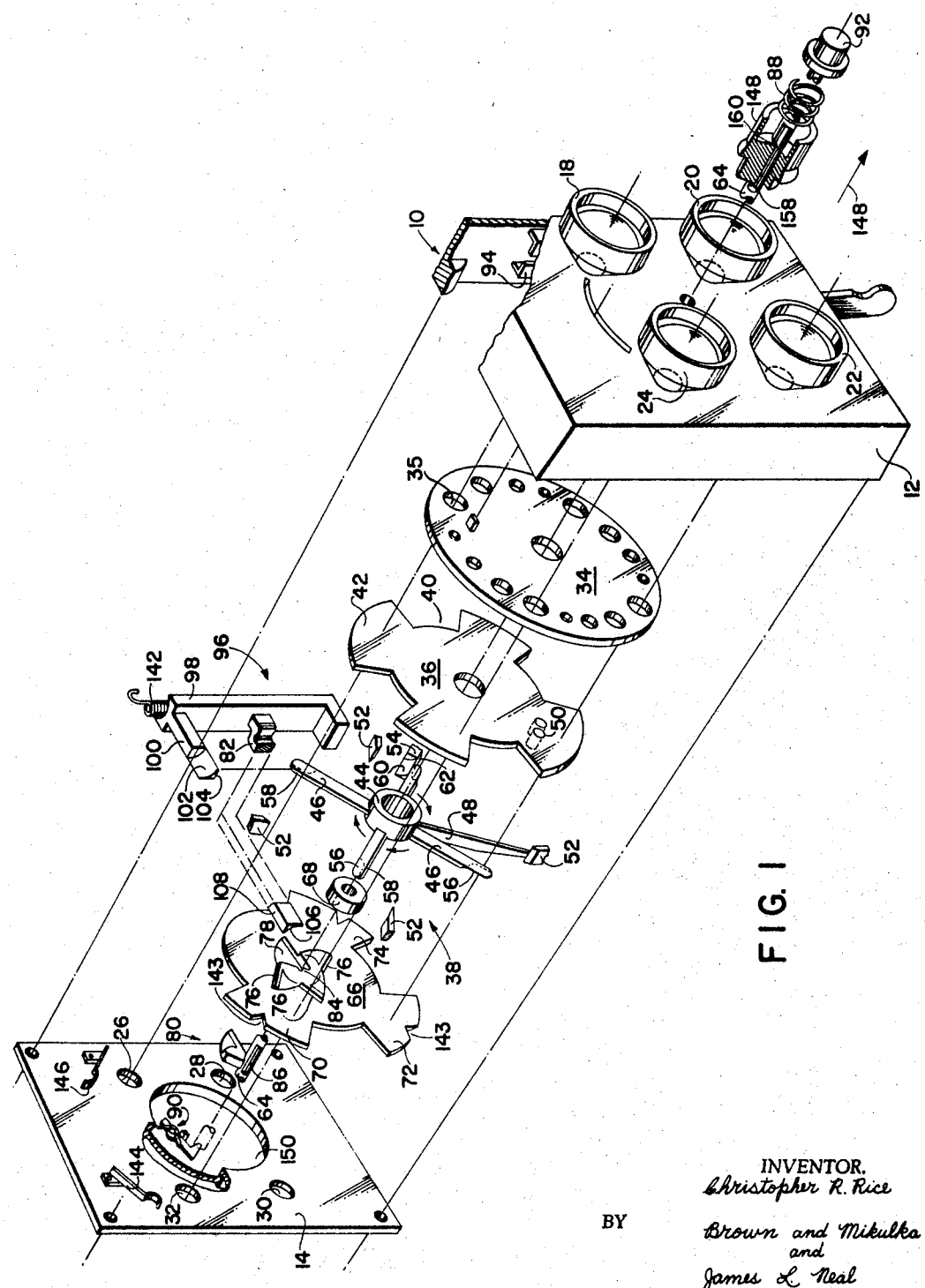
FIGURE 1 is an exploded perspective view of a photographic shutter embodying the present invention.
Figure 2:
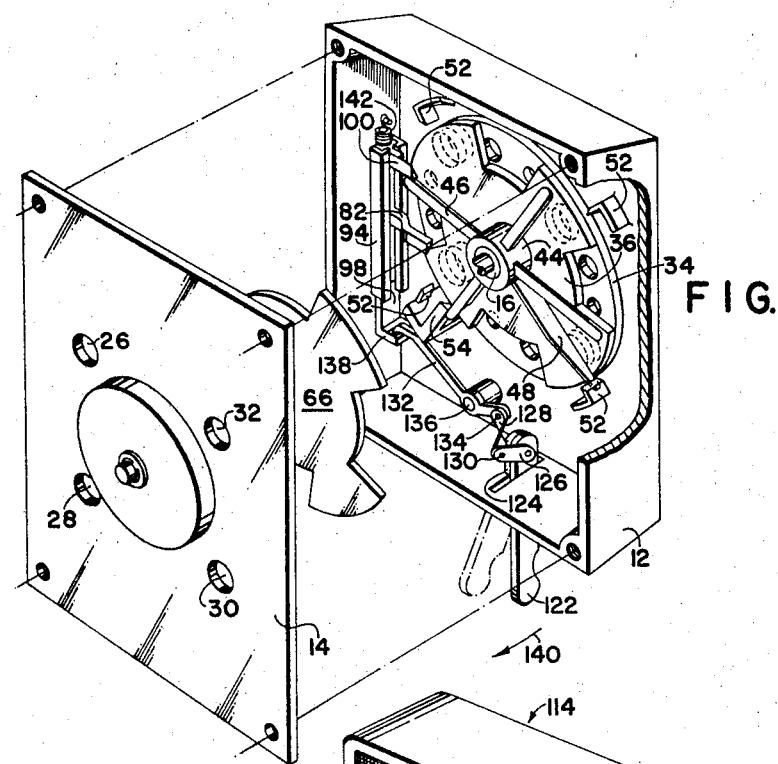
FIG. 2 is a perspective view of the photographic shutter of FIGURE 1, shown with a portion of the shutter housing removed.

Reference is now made to FIGURES 1 and 2 wherein there is illustrated a shutter constructed according to this invention and adapted for the production of a photographic image upon each of four rectangular portions of a rectangular area of a light-sensitive photographic film. The shutter includes housing 10, which comprises front portion 12 and rear portion 14. Front portion 12 of the housing includes boss 16 which extends from the inside wall thereof part way to rear portion 14 of the housing. Four lens assemblies 18, 20, 22 and 24 are mounted on front portion 12, radially outward from boss 16, and openings 26, 28, 30 and 32 are formed in rear portion 14 in alignment with lens assemblies 18, 20, 22 and 24, respectively, which are in alignment with the four portions of the area of negative photographic film.

Boss 16 rotatably supports diaphragm means 34 which includes exposure apertures 35. The diaphragm is mounted against the inside face of front portion 12 and positioned so that any one of a plurality of sets of like size exposure apertures may be interposed between the lens assemblies and the openings in portion 14 in alignment with the openings and the lens assemblies.

Boss 16 also rotatably supports shutter blade 36 and shutter blade rotor 38. The shutter blade includes four openings 40, corresponding to the four exposure apertures. These four openings are positioned between exposure apertures during aperture covering position and the apertures are covered by opaque portions 42 of blade 36. Upon rotation of blade 36, one of the four openings will scan each of the four exposure apertures to substantially simultaneously open and close the same. Rotor 38 includes support 44 from which four arms, 46, and cantilever spring 48 fixedly extend. Means comprising pins 50 connect the cantilever spring to shutter blade 36. This connection will allow a small amount of relative rotary movement between rotor 38 and blade 36 due to the resilience of finger 48 but significant rotation of the rotor will cause exposure producing rotation of shutter blade 36.

Housing 10 supports means for restraining the free end of cantilever spring 48 comprising four individual restraining members which, in the example herein shown and described, are embodied in four abutments 52 positioned in the path of movement of the free end of spring 48. The housing similarly supports stop means 54 for co-operation with arms 46. Each of the arms 46 has a cam surface 56 and a flat actuating surface 58 which cooperate with stop cam surface 60 and flat surface 62, respectively.

Channel 94 is formed in housing 10 and supports actuating means 96. The actuating means includes reciprocating sliding member 98 on which is mounted means for engaging arms 46. In the present embodiment, means for engaging arms 46 is embodied in arm 100 having cam surface 102 and flat actuating surface 104. Trigger 122 and the linkage associated therewith are provided for operation of actuating means 96. The linkage includes a pivotal mounting 124 connecting trigger 122 to housing 10, lever arm 126 attached to trigger 122, link 128 connected to arm 126 by pin 130, lever arm 132 pivotally connected at 136 to the front portion 12 of housing 10 and pivotally connected to link 128 by pin 134, and projection 138 on slide 98. Movement of trigger 122 in the direction of arrow 140 causes lever arm 126 to urge link 128 in an upward direction such that arm 132 pivots about connection 136 to move projection 138 and sliding member 98 in a downward direction against the bias spring 142. Release of trigger 122 allows spring 142 to return slide 98 to its original position and to return arm 132, the linkage and trigger 122 to their original positions.

In operation, movement of slide 98 against the bias of the spring causes surface 104 of actuator arm 100 to engage surface 58 on one of the plurality of arms 46 to initiate rotary movement thereof. This rotation is transmitted through arm 46 to support 44 and from the support to the base of cantilever spring 48. The rotary movement of spring 48 is initially resisted by the engagement of the end of the spring with a first of said plurality of abutments 52. The resistance to rotation causes the spring to flex such that energy is stored therein. Flexure of spring 48 causes its effective length to shorten such that after a predetermined amount of flexure the end thereof will escape the abutment 52 and return to its relaxed state to release the stored energy. The force created by sudden release of the energy is imparted by spring 48 to shutter blade 36 through connecting pins 50. The force, much like a sudden impact force, causes blade 36 to rotate rapidly about its axis such that each of the four openings 40 scans one of the exposure apertures. The mass of blade 36 is such that the blade acts as a flywheel. This action causes the speed of the blade to be substantially constant during its interval of movement.

Rotation of the shutter blade is terminated after approximately one quarter revolution by the engagement of spring 48 with a second of said plurality of abutments 52. Reverse rotation which would normally tend to occur in response to the impact resulting from engagement of the second abutment by the cantilever spring is prevented by the interaction of one of the arms 46 and stop 54. Stop 54 is mounted in such relationship to the plurality of abutments 52 that finger 48 engages an abutment just after one of the plurality of arms 46 has moved past the stop. Cam surfaces 56 on arms 46 cooperate with cam surface 60 of stop 54 to deflect arm 46 so it may pass the stop upon clockwise rotation. Once arm 46 is past stop 54, however, it returns to its original shape and flat surface 58 thereon engages flat surface 62 of stop 54 to prevent rotation of the arm in the counterclockwise direction.

The shutter of the described embodiment of this invention produces substantially simultaneous exposures through a plurality of apertures. If it is desired to produce exposures through one aperture at a time, an opaque masking arrangement may be used to cover the apertures through which exposures are not desired during exposure producing operation of the shutter.

One masking arrangement is illustrated in FIGS. 1 and 2, and disclosed in copending United States application Ser. No. 586,242, entitled Exposure Control Apparatus for Photographic Camera, filed concurrently herewith. This arrangement may be mounted in shutter housing 10 and is adapted to selectively cover all but one of the apertures or to uncover all of the apertures.

Shaft 64 extends through housing 10, centrally of boss 16, and rotatably supports opaque masking member 66. The masking member is mounted rearwardly of boss 16 and spaced therefrom by sleeve 68 which also maintains shutter rotor 38 on boss 16 and positions masking member 66 against rear portion 14 of housing 10. Masking member 66 includes three projections 76 and opening 78. Projections 76 and opening 78 are disposed radially of the rotational axis of member 66 at approximately ninety degree angular intervals. Shaft 64 is connected to member 66 by means of key 84 projecting into opening 78 and slot 86 in shaft 64 so that the shaft and the masking member may move relative to each other axially of shaft 64 but so that rotation of either shaft 64 or member 66 will impart rotation to the other.

Projection 80 has a shape complementary to the shape of opening 78 in member 66 and is mounted on shaft 64 for movement within opening 78, into and out of coplanar relationship with projections 76, in response to axial movement of the shaft.

Shaft 64 is axially biased by spring 88 in the direction of arrow 148 so as to normally position projection 80 in coplanar relationship with projections 76. Axial displacement of shaft 64 relative to member 66 by depression of button 92 in opposition to the bias of spring 88 moves projection 80 out of coplanar relationship with projections 76. Locking means 90 releasably holds shaft 64 in such displaced condition.

In the masking arrangement shown, slide 98 supports arm 82 which includes cam surface 106 and flat surface 108 and which extends into position for engagement with projections 76 and 80. Movement of trigger 122 in the direction of arrow 140 operates the shutter as heretofore described and release of trigger 122 allows spring 142 to return slide 98 to its original position so that the arm may engage one of the coplanar projections 76 or 80 to impart movement thereto.

The apparatus may be operated according to two modes.

According to the first mode of operation simultaneous exposures may be repeatedly produced through all the apertures as when the shutter is not furnished with the masking arrangement. Member 66 is rotated, by knob 148, to a position wherein leaves 70, 72 and 74 thereof are located between the exposure apertures rather than in covering relationship with them. Leaf 70 is positioned between the exposure apertures corresponding to lens assemblies 18 and 24, leaf 74 is located between the exposure apertures which correspond to lens assemblies 20 and 22 and leaf 72 is positioned between exposure apertures which correspond to lens assemblies 22 and 24. When member 66 is initially so positioned, single projection 80 is in coplanar relationship with projections 76 and is appropriately located for engagement by arm 82 on the next upward movement thereof. To prevent rotation of member 66 by arm 82 subsequent to exposure, shaft 64 is moved axially, against the bias of spring 88, by depression of button 92 so that projection 80 moves out of coplanar relationship with projections 76 and thus out of position for possible engagement by arm 82. Locking means 90 is mounted on portion 14 of housing 10 in an appropriate location for engaging slot 86 in shaft 64 when member 66 is rotatably positioned for operation according to the first mode and the shaft is axially displaced so that it will releasably hold the shaft and member 66 against movement. Member 66 thus remains in uncovering relationship with the exposure apertures during and subsequent to exposure producing movement of the shutter.

For operation according to the second mode, shaft 64 is rotated from the position for operation according to the first mode to an initial single exposure station wherein the exposure apertures corresponding to lens assemblies 20, 22 and 24 are covered by opaque leaves 74, 72 and 70, respectively. This rotary movement causes locking means 90 to disengage slot 86 so that shaft 64 is released for return to its initial axial position by bias spring 88. This return of shaft 64 causes projection 80 to return to coplanar relationship with the projections 76. Arm 100 operates the shutter in response to movement of slide 98 against the bias of spring 142 in the manner heretofore described to produce an exposure through the uncovered aperture corresponding to lens assembly 18. Upon return of slide 98 to its initial position by spring 142, arm 82 engages projection 80 to rotate member 66 to the subsequent single exposure station wherein the exposure apertures corresponding to lens assemblies 18, 20 and 22 are covered by opaque leaves 74, 72 and 70, respectively. An exposure is produced through the uncovered aperture corresponding to lens assembly 24 upon movement of slide 98 against the bias of spring 142 and upon return movement of slide 98, arm 82 engages one of the projections 76 to again reposition the opaque masking member. Operation is continued in this manner until four exposures have been produced one at a time in sequence, one exposure being produced through each of the exposure apertures.

Projection 80, projections 76 and arm 82 are provided with appropriate cam surfaces so that arm 82 may move past any of the projections on downward movement of slide 98.

Figure 3:
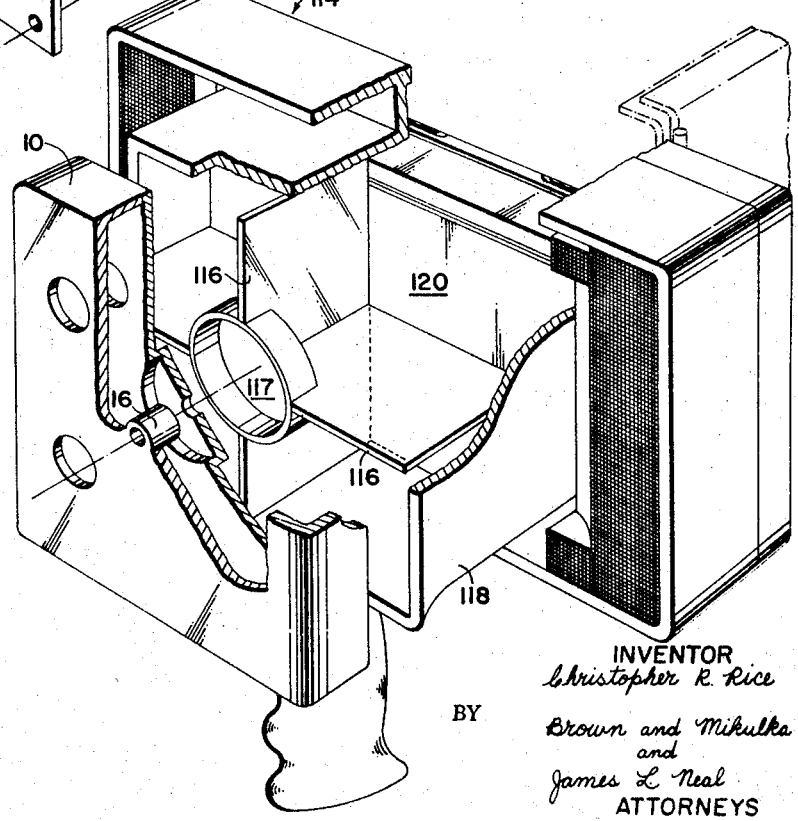
FIG. 3 is a partially cut away perspective view of a camera adapted for use with the shutter of the present invention.

The photographic shutter of this invention may be used in conjunction with a camera of the type shown in FIG. 3.

The camera back is adapted to support rectangular sheet of photosensitive material 120. Shroud 118, which spaces shutter assembly housing 10 from the camera back, and sheet 120 are divided into four rectangular sections by partitions 116 so that each section of the sheet and the shroud are aligned with one of the exposure apertures. Circular recessed chamber 117 accommodates portion 150 of housing 10 and is of sufficient depth to permit the necessary axial movement of shaft 64.

This invention thus provides an inexpensive and easy to operate shutter for photographic apparatus which is particularly suitable for the production of simultaneous exposures through a plurality of exposure apertures.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A shutter for photographic apparatus including at least one exposure aperture comprising:
    (a) a blade mounted for opening and closing movement in one direction relative to said exposure aperture;
    (b) a support mounted for said movement relative to said aperture in said direction;
    (c) a cantilever spring mounted on said support for movement therewith, said spring being connected intermediate its ends to said shutter blade;
    (d) actuating means for moving said support and spring in said direction; and
    (e) retaining means mounted in the path of movement of the free end section of said spring for engaging and resisting movement thereof and flexing said spring in response to movement of said base;
    (f) said retaining means being positioned to permit said spring to escape following predetermined flexure thereof whereby energy stored in said flexed spring is released to impart rapid opening and closing movement to said shutter blade in said direction.

2. Apparatus according to claim 1 further comprising means connecting said cantilever spring to said shutter blade to permit said spring to flex along its entire length.

3. Apparatus according to claim 1 wherein:
    (a) said blade and support are mounted for rotation co-axially;
    (b) said spring extends radially from said support; and
    (c) said actuating means is operative to rotate said support.

4. A shutter as defined in claim 3, for photographic apparatus having a plurality of exposure apertures which are opened and closed at substantially the same time in response to rotary movement of said blade wherein said retaining means comprises a retaining member for each of said apertures, each of said retaining members being positioned for engaging said spring when said blade is in position for closing said apertures and for preventing movement of said blade until said spring is flexed.

5. Apparatus according to claim 3 wherein said actuated means comprises:
    (a) a reciprocating member;
    (b) an arm for each exposure aperture extending radially from said support for rotation, one arm at a time, into the path of movement of a portion of said reciprocating member;
    (c) means associated with said reciprocating member for engaging said one arm upon each movement of said reciprocating member in a first direction for rotating said support and to move past without moving another of said arms upon movement of said reciprocating member in a second direction.

References Cited

UNITED STATES PATENTS

| 2,860,558 | 11/1919 | Roehrig | 95—18 |
| 2,966,102 | 12/1960 | Whittier | 95—59 XR |
| 2,986,986 | 6/1961 | Eloranta | 95—59 XR |
| 3,128,685 | 4/1964 | Kitrosser | 95—18 |
| 3,323,432 | 6/1967 | Rabanit | 95—58 XR |

NORTON ANSHER, *Primary Examiner.*

L. H. McCORMICK, JR., *Assistant Examiner.*

UNITED STATES PATENT OFFICE
CERTIFICATE OF CORRECTION

Patent No. 3,429,247                                                                      February 25, 1969

Christopher R. Rice

It is certified that error appears in the above identified patent and that said Letters Patent are hereby corrected as shown below:

In the heading to the printed specification, line 5, "Massachusetts" should read -- Delaware --. Column 6, line 24, "11/1919" should read -- 11/1958 --.

Signed and sealed this 31st day of March 1970.

(SEAL)
Attest:

Edward M. Fletcher, Jr.                                WILLIAM E. SCHUYLER, JR.
Attesting Officer                                                 Commissioner of Patents